US012804315B2

(12) United States Patent
Rao et al.

(10) Patent No.: US 12,804,315 B2
(45) Date of Patent: Nov. 17, 2026

(54) SPEAKER DEVICE USING INJECTION MOLDING FOR INCREASING A BONDING STREGTH AND PROVIDING AN EFFECTIVE WATERPROOFING

(71) Applicant: MERRY ELECTRONICS (SUZHOU) CO., LTD., Jiangsu Province (CN)

(72) Inventors: LiGuo Rao, Jiangsu Province (CN); ChunLong Zheng, Jiangsu Province (CN)

(73) Assignee: MERRY ELECTRONICS (SUZHOU) CO., LTD., Jiangsu Province (CN)

( * ) Notice: Subject to any disclaimer, the term of this patent is extended or adjusted under 35 U.S.C. 154(b) by 81 days.

(21) Appl. No.: 18/909,736

(22) Filed: Oct. 8, 2024

(65) Prior Publication Data

US 2025/0142252 A1 May 1, 2025

(30) Foreign Application Priority Data

Oct. 30, 2023 (CN) ........................ 202311422099.X

(51) Int. Cl.
*H04R 1/44* (2006.01)
*H04R 7/20* (2006.01)
(Continued)

(52) U.S. Cl.
CPC ................. *H04R 1/44* (2013.01); *H04R 7/20* (2013.01); *H04R 9/025* (2013.01); *H04R 9/045* (2013.01); *H04R 9/06* (2013.01); *H04R 2400/11* (2013.01)

(58) Field of Classification Search
CPC . H04R 1/44; H04R 7/20; H04R 9/025; H04R 9/045; H04R 9/06; H04R 2400/11
See application file for complete search history.

(56) References Cited

U.S. PATENT DOCUMENTS 9,258,630 B2 2/2016 Chu et al.
10,932,045 B2 * 2/2021 Wu ......................... H04R 9/06
(Continued)

FOREIGN PATENT DOCUMENTS

CN 204498359 U 7/2015
CN 204741557 U 11/2015
(Continued)

OTHER PUBLICATIONS

Taiwanese Office Action and Search Report for Taiwanese Application No. 113120859, dated Jul. 29, 2025, with English translation.
(Continued)

*Primary Examiner* — Andrew Sniezek
(74) *Attorney, Agent, or Firm* — Birch, Stewart, Kolasch & Birch, LLP

(57) ABSTRACT

A speaker device is disclosed in this application. The speaker device includes a magnetic guiding plate, a magnetic circuit module and a vibration module. The magnetic circuit module includes a main magnet and an auxiliary magnet, wherein the main magnet and the auxiliary magnet are disposed on the magnetic guiding plate, and the auxiliary magnet is disposed on the outer side of the main magnet. The vibration module includes a bracket, a vibration component and a voice coil, wherein the bracket is disposed on the auxiliary magnet, the vibration component is disposed on the bracket and is located on the magnetic circuit module, the voice coil is disposed under the vibration component, and is located between the main magnet and the auxiliary magnet.

15 Claims, 6 Drawing Sheets

(51) Int. Cl.

| | |
|---|---|
| ***H04R 9/02*** | (2006.01) |
| ***H04R 9/04*** | (2006.01) |
| ***H04R 9/06*** | (2006.01) |

(56) References Cited

U.S. PATENT DOCUMENTS

| | | | |
|---|---|---|---|
| 11,632,609 | B1 | 4/2023 | Lee et al. |
| 2003/0156731 | A1 | 8/2003 | Sato |
| 2007/0201712 | A1 | 8/2007 | Saiki |
| 2012/0237076 | A1 | 9/2012 | Kuze |
| 2016/0014522 | A1 | 1/2016 | Matsumura et al. |
| 2016/0212526 | A1 | 7/2016 | Salvatti et al. |
| 2018/0152800 | A1 | 5/2018 | Cai et al. |
| 2018/0302722 | A1 | 10/2018 | Linghu et al. |
| 2020/0213758 | A1 | 7/2020 | Liao |
| 2022/0174381 | A1 | 6/2022 | Jin et al. |
| 2022/0191619 | A1 | 6/2022 | Liang et al. |
| 2023/0179922 | A1 | 6/2023 | Song et al. |
| 2023/0217181 | A1 | 7/2023 | Yang et al. |

FOREIGN PATENT DOCUMENTS

| | | | |
|---|---|---|---|
| CN | 205726370 | U | 11/2016 |
| CN | 107277706 | A | 10/2017 |
| CN | 111836176 | A | 10/2020 |
| CN | 215647325 | U | 1/2022 |
| CN | 112492464 | B | 3/2022 |
| CN | 114598972 | A | 6/2022 |
| CN | 114697818 | A | 7/2022 |
| CN | 112398989 | B | 6/2023 |
| CN | 219248052 | U | 6/2023 |
| CN | 116684793 | A | 9/2023 |
| TW | M580833 | U | 7/2019 |
| TW | 202222084 | A | 6/2022 |
| WO | WO 2023/179303 | A1 | 9/2023 |

OTHER PUBLICATIONS

Taiwanese Office Action and Search Report for Taiwanese Application No. 113120861, dated Jul. 29, 2025, with English translation.

Taiwanese Office Action and Search Report for Taiwanese Application No. 113120862, dated Jul. 29, 2025, with English translation.

U.S. Office Action for U.S. Appl. No. 18/909,573, dated Apr. 6, 2026.

Chinese Office Action and Search Report for Chinese Application No. 202311425683.0, dated Aug. 10, 2026, with English translation.

Du et al., "Main factors affecting the sound quality of dynamic loudspeaker," Audio Engineering, vol. 41 No. 9/10, 2017, pp. 45-48 (12 pages total), with English translation.

* cited by examiner

SPEAKER DEVICE USING INJECTION MOLDING FOR INCREASING A BONDING STREGTH AND PROVIDING AN EFFECTIVE WATERPROOFING

CROSS REFERENCE TO RELATED APPLICATION

This application claims the priority benefit of Chinese Patent Application Serial Number 202311422099.X, filed on Oct. 30, 2023, the full disclosure of which is incorporated herein by reference.

BACKGROUND

Technical Field

The technical field of this application involves the design of waterproof speaker devices, and especially involves a speaker device.

Related Art

In the current market, a waterproof speaker used in smartwatches and intelligent wearable devices has independent designs for a sealed waterproof structure and a speaker structure. Because both the sealed waterproof structure and the speaker structure are independent and cannot be combined effectively and appropriately, the overall waterproof performance of the speaker is poor. Because the sealed waterproof structure of the speaker and the speaker structure cannot be combined, the waterproof structure is easily detached from the waterproof speaker and the manufacturing cost of the waterproof speaker is high. Additionally, the magnetic circuit structure and vibration structure within the speaker are only bonded with simple adhesives, resulting in the poor anti-drop effect of the speaker structure. The existing design for the speaker structure related to the waterproof still faces the aforementioned issues that need to be addressed.

SUMMARY

The embodiments of the present application provide a speaker device that addresses the issue of easy detachment of the waterproof structure and the poor waterproof performance of the waterproof structure due to the unstable combination of the sealed waterproof structure and the speaker device structure by utilizing the injection molding to combine the elastic supporting component of the vibration component with the bracket.

To address the abovementioned technical issues, the present application is embodied as follows.

A speaker device is provided, including: a magnetic guiding plate, a magnetic circuit module and a vibration module. The magnetic circuit module includes a main magnet and an auxiliary magnet, the main magnet and the auxiliary magnet are disposed on the magnetic guiding plate, and the auxiliary magnet is disposed on the outer side of the main magnet. The vibration module includes a bracket, a vibration component and a voice coil, the bracket is disposed on the auxiliary magnet, the vibration component is disposed on the bracket and is located on the magnetic circuit module, the voice coil is disposed under the vibration component, and is located between the main magnet and the auxiliary magnet. The vibration component includes a diaphragm and an elastic support component, the bracket has an inner sidewall, an outer sidewall and a plurality of fixing holes penetrating the inner sidewall and the outer sidewall, the elastic support component has a connection part, an elastic part and a fixing part which are formed by integral injection molding, each of the connection part and the elastic part has an inner side and an outer side respectively, the inner side of the connection part is connected to and fixed to the diaphragm, the outer side of the connection part is connected to the inner side of the elastic part, the outer side of the elastic part is connected to the fixing part, and the fixing part is formed on the inner sidewall, the outer sidewall and the plurality of fixing holes.

In one embodiment, the fixing part includes an inner fixing part and an outer fixing part which are connected to each other by the plurality of fixing holes, the inner fixing part is fixed on the inner sidewall, and the outer fixing part is fixed on the outer sidewall.

In one embodiment, the outer fixing part of the fixing part has a protrusion part disposed one side far away from the inner fixing part.

In one embodiment, the protrusion part has a convex surface, a first inclined surface and a second inclined surface, the first inclined surface and the second inclined surface are disposed at both sides of the convex surface, and the first inclined surface and the second inclined surface are symmetrically arranged based on the convex surface.

In one embodiment, the outer sidewall has an outer trough connected to the plurality of fixing holes mutually, and the outer trough and the plurality of fixing holes are filled with the ouster fixing part.

In one embodiment, the outer sidewall further includes an outer fixing trough positioned in the outer trough, the outer fixing trough and the outer trough are connected to each other, and the outer fixing trough is further filled with the outer fixing part.

In one embodiment, the inner sidewall has an inner trough connected to the plurality of fixing holes mutually, and the inner trough and the plurality of fixing holes are filled with the inner fixing part.

In one embodiment, the outer side of the elastic part is divided into a first elastic connection side and a second elastic connection side, the first elastic connection side extends to and is attached to a trough wall of the inner trough, the first elastic connection side is connected to the inner fixing part, and the second elastic connection side extends toward and is attached to a sidewall above an opening of the inner trough.

In one embodiment, the inner side of the connection part wraps a periphery of the diaphragm.

In one embodiment, the voice coil is connected and fixed to the connection part.

In one embodiment, a support ring is further included, wherein the bracket has an inner side, and there is a connection position between the inner side of the bracket and the elastic part, and the support ring is disposed on the connection position between the inner side of the bracket and the elastic part.

In one embodiment, the magnetic circuit module further includes a main magnetic guiding component and an auxiliary magnetic guiding component, the main magnetic guiding component is disposed on the main magnet, and the auxiliary magnetic guiding component is disposed on the auxiliary magnet.

In one embodiment, the auxiliary magnetic guiding component includes an inner magnetic guiding part and an outer magnetic guiding part, the outer magnetic guiding part is disposed on an outer side of the inner magnetic guiding part, a height from a top surface of the inner magnetic guiding part to a top surface of the auxiliary magnet is higher compared to that from a top surface of the outer magnetic guiding part to the top surface of the auxiliary magnet.

In one embodiment, the bracket has a frame body disposed on the outer magnetic guiding part.

In one embodiment, the bracket has a bottom with a fixing notch, and the outer magnetic guiding part is fixed in the fixing notch.

The present application provides a speaker device, which forms the clastic support component of the vibration component on the inner sidewall, the outer sidewall and the plurality of fixing holes of the bracket by the integral injection molding so that the elastic support component can be firmly combined with the bracket, not only can the bonding strength between the vibration component and the bracket be improved, but also the complete seal of the vibration component and the bracket can be realized in order to achieve the effective waterproofing effect.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The accompanying drawings herein are provided to have a further understanding on the present application and constitutes a part of the present application. The schematic embodiments and the description of the present application is used to explain the present application instead of constituting inappropriate limitation. In the drawings.

Figure 1:
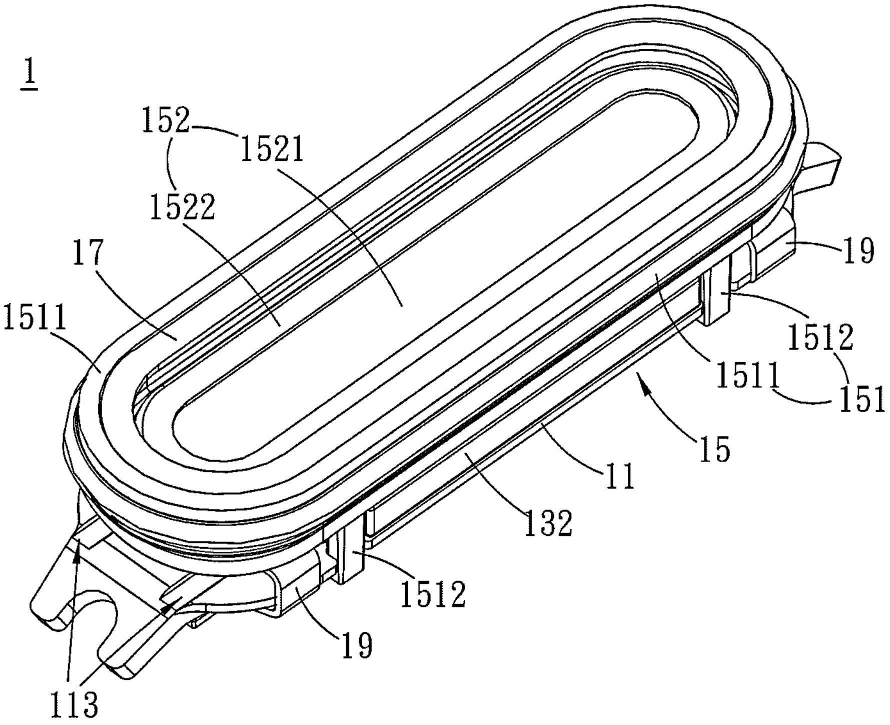
FIG. 1 is a perspective view of the speaker device of the present application.

The illustration is provided in conjunction with the accompanying drawings: 1: speaker device; 11: magnetic guiding plate; 111: plate notch; 112: connecting trough; 113: groove; 13: magnetic circuit module; 131: main magnet; 132: auxiliary magnet; 1321: notch; 133: main magnetic guiding component; 134: auxiliary magnetic guiding component; 1340: side notch; 1341: inner magnetic guiding part; 1342: outer magnetic guiding part; 1343: circuit notch; 15: vibration module; 151: bracket; 1510: fixing notch; 1511: frame body; 15111: inner sidewall; 15112: outer sidewall; 15113: fixing hole; 15114: outer trough; 15115: outer fixing trough; 15116: inner trough; 1512: hot melting pillar; 15121: hot melt end part; 152: vibration component; 1521: diaphragm; 1522: clastic support component; 15221: connection part; 15222: elastic part; 152221: first elastic connection side; 152222: second elastic connection side; 15223: fixing part; 15224: inner fixing part; 15225: outer fixing part; 15226: protrusion part; 152261: convex surface; 152262: first inclined surface; 152263: second inclined surface; 153: voice coil; 17: support ring; 19: conductive component; 191: conductive part; 192: conductive circuit.

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

Figure 2:
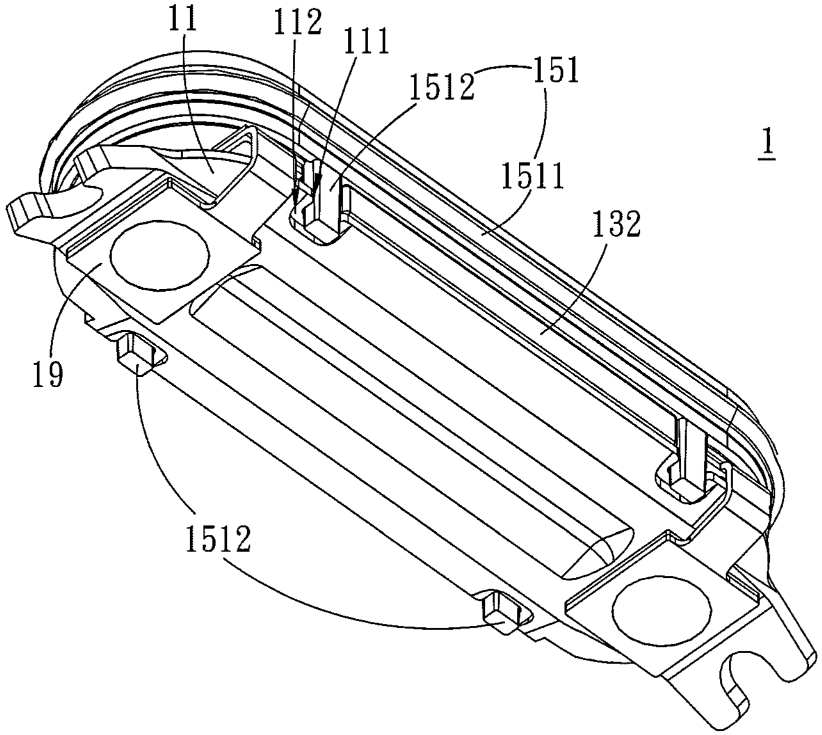
FIG. 2 is another perspective view of the speaker device of the present application.
Figure 3:
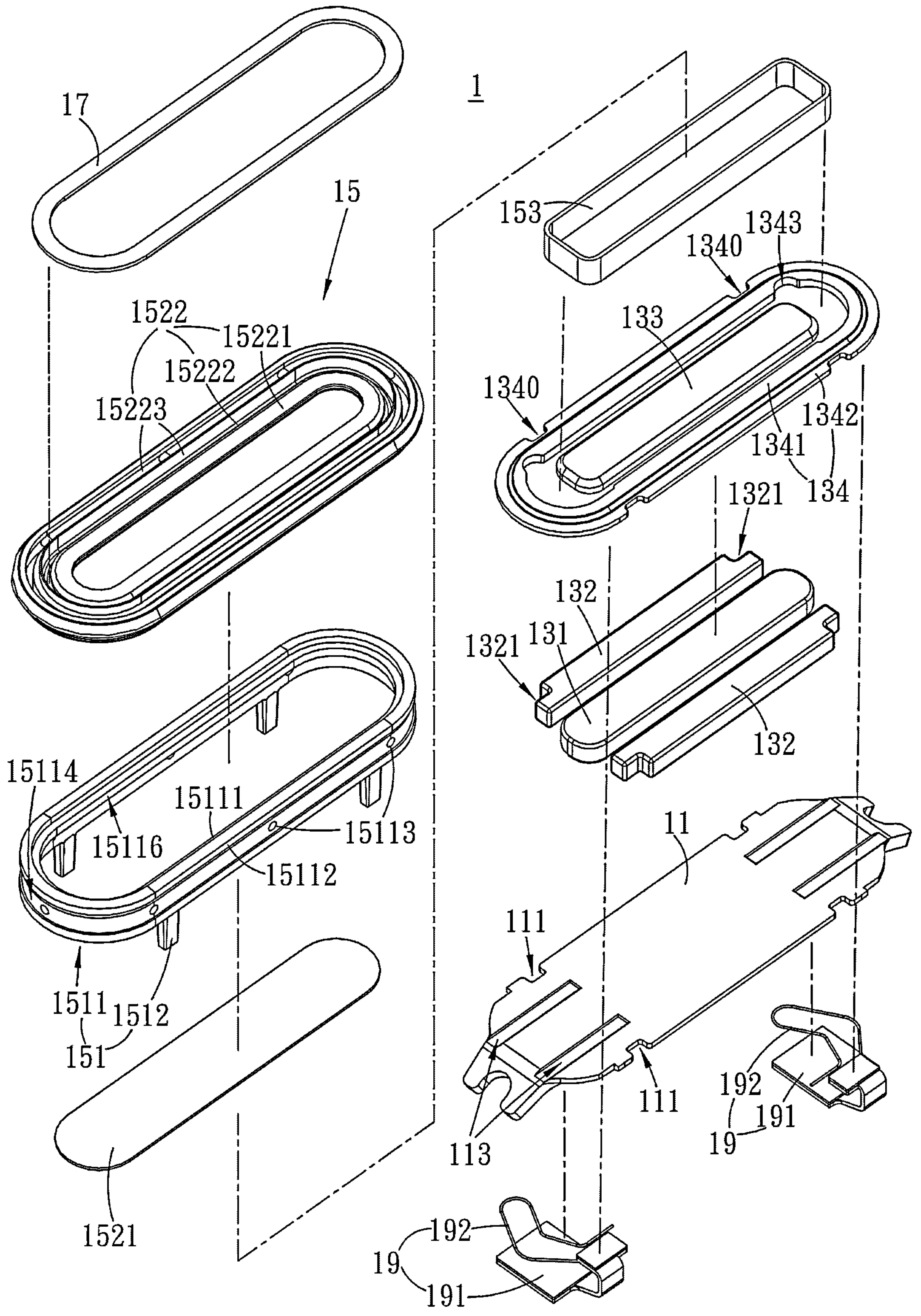
FIG. 3 is an exploded view of the speaker device of the present application.
Figure 4:
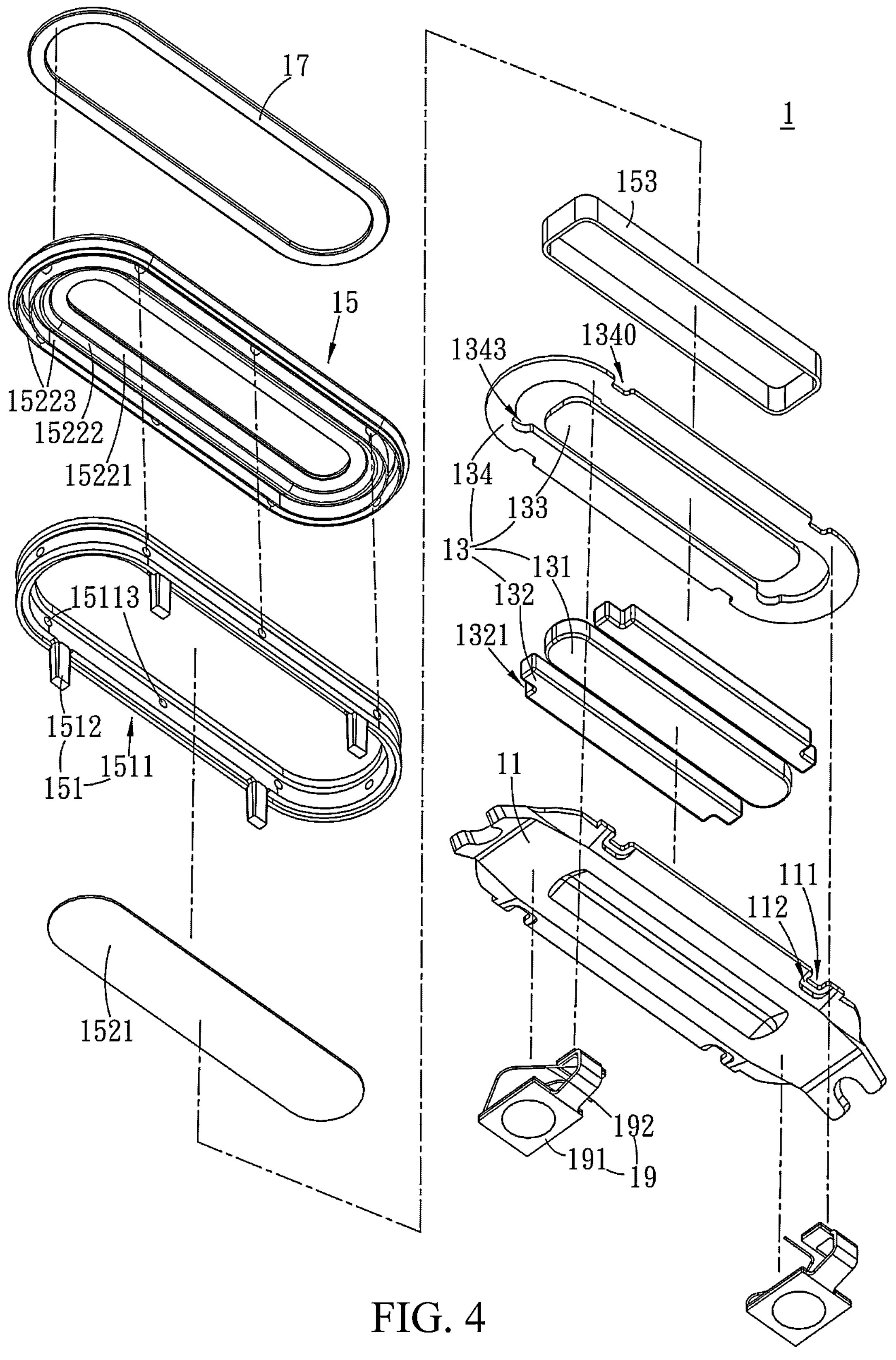
FIG. 4 is another exploded view of the speaker device of the present application.
Figure 5:
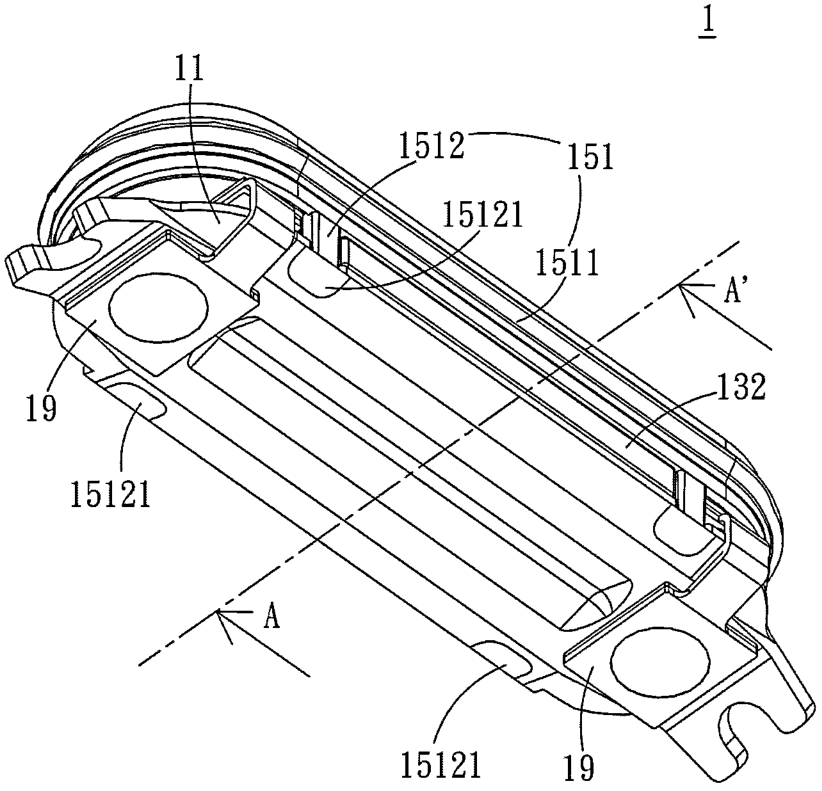
FIG. 5 is another perspective view of the speaker device of the present application.
Figure 6:
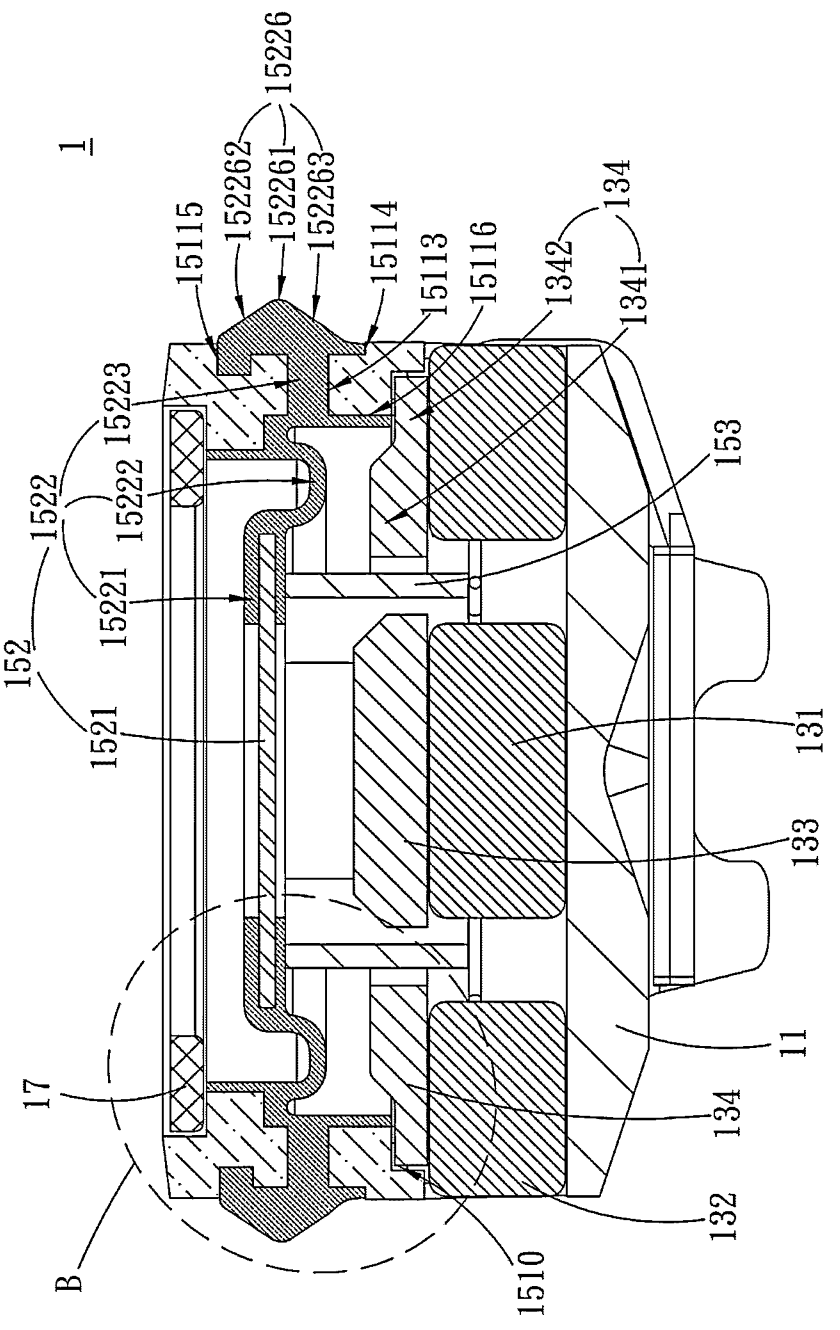
FIG. 6 is a cross-sectional view of line A-A' in FIG. 5.

Please refer to FIG. 1 to FIG. 6, wherein FIG. 1 is a perspective view of the speaker device; FIG. 2 is another perspective view; FIG. 3 is an exploded view; FIG. 4 is another exploded view; FIG. 5 is another perspective view; and FIG. 6 is a cross-sectional view of line A-A' in FIG. 5. As shown in the figures, the present application provides a speaker device 1 including: a magnetic guiding plate 11, a magnetic circuit module 13 and a vibration module 15. The magnetic circuit module 13 includes a main magnet 131 and an auxiliary magnet 132, the main magnet 131 and the auxiliary magnet 132 are disposed on the magnetic guiding plate 11, and the auxiliary magnet 132 is disposed on the outer side of the main magnet 131. The vibration module 15 includes a bracket 151, a vibration component 152 and a voice coil 153. The bracket 151 includes a frame body 1511 and a hot melting pillar 1512, the frame body 1511 is disposed on the auxiliary magnet 132, and one end of the hot melting pillar 1512 extends downward from the frame body 1511 to pass through the magnetic guiding plate 11 and is melted and fixed on the magnetic guiding plate 11. The vibration component 152 is disposed on the frame body

1511 and is located on the magnetic circuit module 13. The voice coil 153 is disposed under the vibration component 152 and is located between the main magnet 131 and the auxiliary magnet 132.

In this embodiment, there are four hot melting pillars 1512 respectively corresponding to the locations adjacent to the four corners of the frame body 1511, the magnetic guiding plate 11 has a plurality of plate notches 111, each of the plate notches 111 is corresponding to one hot melting pillar 1512, and one end of the hot melting pillar 1512 passes through the corresponding plate notch 111, making the frame body 1511 of the bracket 151 of the vibration module 15 be stably positioned on the location of the magnetic guiding plate 11 (as shown in FIG. 2). Furthermore, the magnetic guiding plate 11 has a plurality of connecting troughs 112, the notch of the connecting trough 112 is far away from the magnetic circuit module 13, and in other words, the connecting trough 112 is located on the bottom of the magnetic guiding plate 11. The trough bottom of the connecting trough 112 has a plate notch 111, and one end of the hot melting pillar 1512 has a hot melt end part 15121 melted and fixed in the connecting trough 112 so that the hot melt end part 15121 of the hot melting pillar 1512 deforms, and the connecting trough 112 is filled with the hot melt end part 15121 of the hot melting pillar 1512, and the hot melt end part 15121 and the bottom of the magnetic guiding plate 11 form a flat bottom structure (as shown in FIG. 5). Therefore, the bracket 151 on the outer side of the entire structure of the speaker device 1 is effectively and stably fixed on the magnetic guiding plate 11 of the bottom of the entire structure of the speaker device 1. After the magnetic circuit module 13 is disposed between the magnetic guiding plate 11 and the vibration module 15, the bracket 151 of the vibration module 15 is hot melted and fixed on the magnetic guiding plate 11, and thus, the entire structure strength of the speaker device 1 may be enhanced and the anti-drop effect of the speaker device 1 may be improved.

In addition, the magnetic guiding plate 11 has a groove 113 disposed on one side of the magnetic guiding plate 11 which has the magnetic circuit module 13, and the groove 113 is disposed between the main magnet 131 and the auxiliary magnet 132. There are four grooves 113 respectively disposed on the two sides of the magnetic guiding plate 11, and each of the four grooves 113 respectively extends outward, and the groove 113 is partially corresponding to the voice coil 153. In this embodiment, the groove 113 can serve as a weight reduction structure to reduce the overall weight of the magnetic guiding plate 11, and avoid the lead of the voice coil 153 connected to the conductive module 19 from colliding with the magnetic guiding plate 11 when the voice coil 153 is provided to the speaker device 1 for operation, and further, the speaker device 1 is influenced to produce sound.

In this embodiment, the magnetic circuit module 13 further includes a main magnetic guiding component 133 and an auxiliary magnetic guiding component 134, the main magnetic guiding component 133 is disposed on the main magnet 131, and the auxiliary magnetic guiding component 134 is disposed on the auxiliary magnet 132. The main magnetic guiding component 133 and the auxiliary magnetic guiding component 134 are used to concentrate the magnetic lines of the main magnet 131 and the auxiliary magnet 132 to enhance the strength of the magnetic field of the main magnet 131 and the auxiliary magnet 132. Furthermore, the main magnetic guiding component 133 is a long plate structure corresponding to the rectangular structure of the main magnet 131, and the main magnetic guiding component 133 serves as an assistant structure for the main magnet 131 to strengthen the magnetic field. Furthermore, the circle structure of the auxiliary magnetic guiding component 134 is corresponding to that of the bracket 151 of the vibration module 15, and the auxiliary magnetic guiding component 134 serves as an auxiliary support structure of the vibration module 15 in addition to serving as an assistant structure for the auxiliary magnet 132 to strengthen the magnetic field.

Furthermore, the outer side of the auxiliary magnetic guiding component 134 has a plurality of side notches 1340, the number of the side notches 1340 is corresponding to the number of the hot melting pillar 1512. One end of the hot melt end part 15121 of the hot melting pillar 1512 passes through the corresponding side notch 1340, so that the hot melting pillar 1512 and the auxiliary magnetic guiding component 134 are further assembled and fitted to reinforce the structure combination strength of the vibration module 15 and the magnetic circuit module 13. In addition, the two ends of the auxiliary magnet 132 have notches 1321 respectively, and one end of the hot melt end part 15121 of the hot melting pillar 1512 passes through the corresponding notch 1321, wherein the notch 1321 of the auxiliary magnet 132 is corresponding to the side notch 1340 of the auxiliary magnetic guiding component 134. So, the hot melting pillar 1512 and the auxiliary magnet 132 are further assembled and fitted to reinforce the structure combination strength of the vibration module 15 and the magnetic circuit module 13, and meanwhile, the auxiliary magnet 132 is fixed between the two hot melting pillars 1512.

Figure 7:
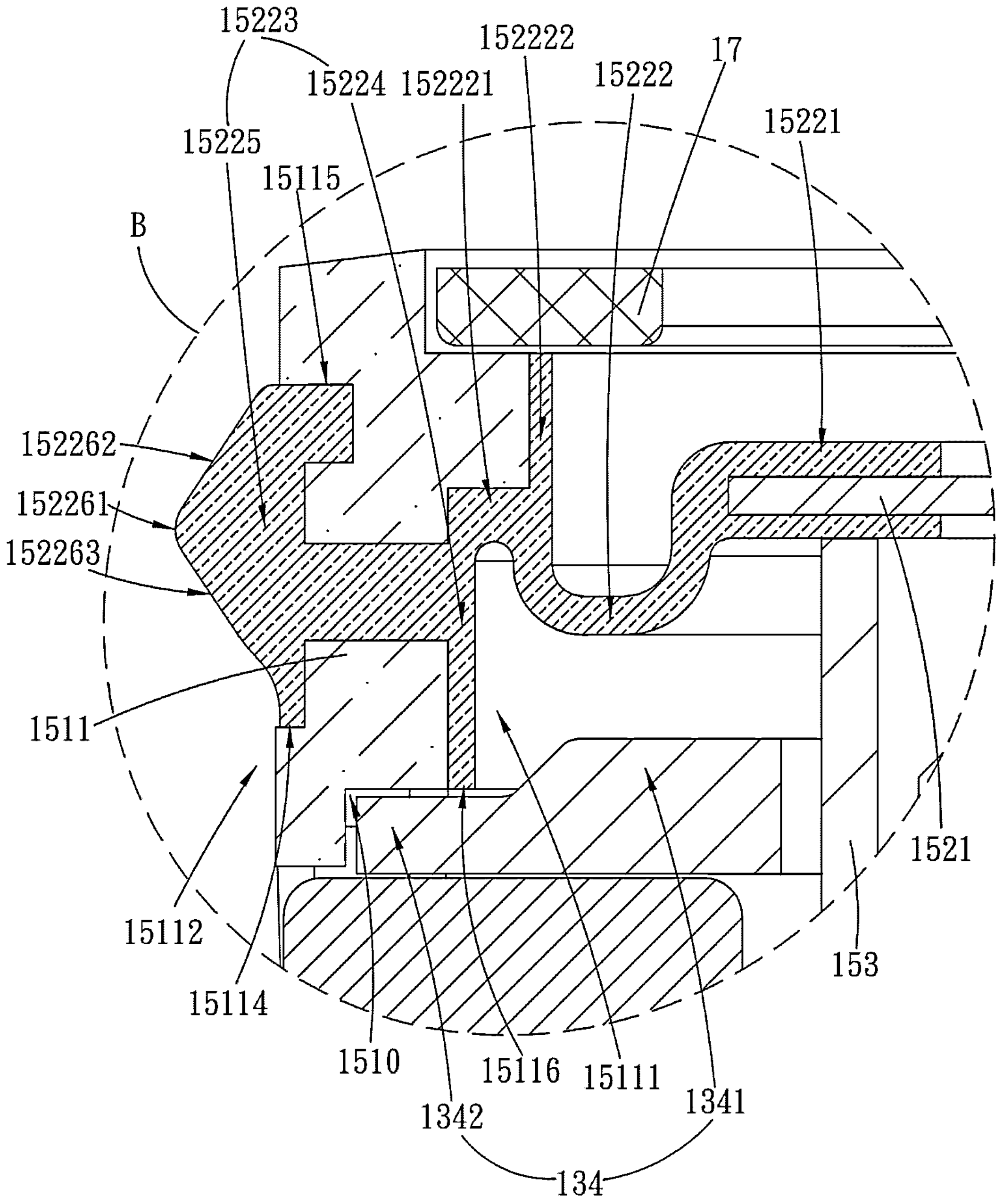
FIG. 7 is an enlarged view of area B of FIG. 6.

Please refer to FIG. 7, which is an enlarged view of area B of FIG. 6. In this embodiment, the auxiliary magnetic guiding component 134 includes an inner magnetic guiding part 1341 and an outer magnetic guiding part 1342, and the outer magnetic guiding part 1342 is disposed on the outer side of the inner magnetic guiding part 1341, and the height from the top surface of the inner magnetic guiding part 1341 to the top surface of the auxiliary magnet 132 is higher than that from the top surface of the outer magnetic guiding part 1342 to the top surface of the auxiliary magnet 132. In other words, the height of the auxiliary magnetic guiding component 134 relative to one side of the vibration module 15 is that the internal height higher than the external height. In addition, the frame body 1511 of the bracket 151 is disposed on the outer magnetic guiding part 1342, the bottom of the bracket 151 has a fixing notch 1510, and the outer magnetic guiding part 1342 is fixed in the fixing notch 1510. Thus, the frame body 1511 of the bracket 151 and the outer magnetic guiding part 1342 of the auxiliary magnetic guiding component 134 can be combined and fixed stably.

Please refer to FIG. 6 and FIG. 7 again, FIG. 6 is a cross-sectional view of line A-A' in FIG. 5 and FIG. 7 is an enlarged view of area B of FIG. 6. As shown in the figures, the vibration component 152 includes a diaphragm 1521 and an elastic support component 1522, the elastic support component 1522 supports the periphery of the diaphragm 1521, and the elastic support component 1522 is disposed on the bracket 151. The diaphragm 1521 primarily serves as the vibrating membrane structure in the sound-emitting area of the speaker device 1, the sound is primarily emitted through the diaphragm 1521, and the elastic support component 1522 primarily forms the edge structure for the sound-emitting area of the speaker device 1, providing an elastic space for the up-and-down vibration of the diaphragm 1521.

Furthermore, in this embodiment, the elastic support component 1522 includes a connection part 15221, an elastic part 15222 and a fixing part 15223 which are integrally formed. When the speaker device 1 is immersed into the water, the elastic part 15222 of the elastic support component 1522 suffers the compression caused by hydraulic pressure toward the interior of the speaker device 1. The compression causes the elastic support component 1522 to be recessed toward the inner magnetic guiding part 1341 of the auxiliary magnetic guiding component 134. The inner magnetic guiding part 1341 is designed as a platform which protrudes towards the clastic support component 1522 of the vibration component 152, and the elastic part 15222 of the elastic support component 1522 undergoes the structural support from the inner magnetic guiding part 1341. Hence, the impact of the elastic part 15222 of the elastic support component 1522 caused by the compression of the hydraulic pressure would be reduced and the risk of cracking the elastic part 15222 of the elastic support component 1522 and so forth due to excessive hydraulic pressure would be even reduced.

In this embodiment, the elastic support component 1522 of the vibration component 152 is produced on the frame body 1511 of the bracket 151 by the injection molding. The frame body 1511 of the bracket 151 has an inner sidewall 15111, an outer sidewall 15112 and a plurality of fixing holes 15113 penetrating the inner sidewall 15111 and the outer sidewall 15112. The elastic support component 1522 includes the connection part 15221, the elastic part 15222 and the fixing part 15223, the connection part 15221, elastic part 15222 and fixing part 15223 of the clastic support component 1522 are integrally formed, the inner side of the connection part 15221 is connected to and fixed to the diaphragm 1521, the outer side of the connection part 15221 is connected to the inner side of the elastic part 15222, the outer side of the elastic part 15222 is connected to the inner sidewall 15111 of the frame body 1511 and the fixing part 15223, and the fixing part 15223 is formed on the inner sidewall 15111, outer sidewall 15112 and the plurality of the fixing holes 15113; wherein, the fixing part 15223 is made of silicone sealants, the connection part 15221 and the elastic part 15222 are made of silicone membranes, and the fixing part 15223, the connection part 15221 and the elastic part 15222 are integrally formed. The elastic support component 1522 in this embodiment is fixed on the frame body 1511 by integrally forming to enhance the anti-drop effect of the speaker device 1.

As the abovementioned, the fixing part 15223 includes an inner fixing part 15224 and an outer fixing part 15225, the inner fixing part 15224 and the outer fixing part 15225 are connected with each other through the plurality of fixing holes 15113, the inner fixing part 15224 is fixed on the inner sidewall 15111, and the outer fixing part 15225 is fixed on the outer sidewall 15112. The outer fixing part 15225 of the fixing part 15223 has a protrusion part 15226 positioned on one side far away from the inner fixing part 15224. In other words, the protrusion part 15226 of the outer fixing part 15225 is corresponding to the outer side of the speaker device 1. Furthermore, the protrusion part 15226 has a convex surface 152261, a first inclined surface 152262 and a second inclined surface 152263, the first inclined surface 152262 and second inclined surface 152263 are disposed at both sides of the convex surface 152261, and the first inclined surface 152262 and the second inclined surface 152263 are symmetrically arranged based on the convex surface 152261. When the speaker device 1 is submerged in water, the convex surface 152261, the first inclined surface 152262, and the second inclined surface 152263 can disperse the pressure caused by the compression of the external hydraulic pressure on the interior of the speaker device 1, causing the external pressure relative to the convex surface 152261 to be dispersed to the first inclined surface 152262 and second inclined surface 152263. Thus, the pressure on the outer fixing part 15225 is distributed, and further, the interior pressure of the speaker device 1 caused by the hydraulic pressure is relieved.

In addition, the outer sidewall 15112 of the frame body 1511 of the bracket 151 has an outer trough 15114 connected to the plurality of fixing holes 15113 mutually, and the outer trough 15114 and the plurality of fixing holes 151113 are filled with the outer fixing part 15225. Furthermore, the outer sidewall 15112 has an outer fixing trough 15115 positioned in the outer trough 15114, the outer fixing trough 15115 and the outer trough 15114 are connected to each other, and further, the outer fixing trough 15115 is filled with the outer fixing part 15225. The outer fixing trough 15115 in this embodiment can be positioned on the upper position or/and lower position relative to the plurality of fixing holes 15113, and the position of the outer fixing trough 15115 can be adjusted according to the users' need. Through the outer trough 15114 and outer fixing trough 15115, the contact area of the outer sidewall 15112 relative to the outer fixing part 15225 is increased. Hence, the structural bonding strength of the outer fixing part 15225 formed on the outer sidewall 15112 is enhanced and the frame body 1511 and the fixing part 15223 of the elastic support component 1522 constitute a non-planar structure, which is beneficial to prevent the water from entering the interior of the speaker device 1. In addition, the inner sidewall 15111 of the frame body 1511 of the bracket 151 has an inner trough 15116 connected to the plurality of fixing holes 15113 mutually, and the inner trough 15116 and the plurality of fixing holes 15113 are filled with the inner fixing part 15224.

In this embodiment, the elastic part 15222 serves as a connecting structure to connect the fixing part 15223 and the connection part 15221. The elastic part 15222 has the largest tensile toughness, and provides a structure for the connection part 15221, diaphragm 1521 and voice coil 153 to vibrate, and also serves as a structure for limiting vibration amplitude. The outer side of the elastic part 15222 is divided into the first elastic connection side 152221 and the second elastic connection side 152222. The first elastic connection side 152221 extends and is attached to the trough wall of the inner trough 15116, the first elastic connection side 152221 is connected to the inner fixing part 15224, and the second elastic connection side 152222 extends and is attached to the sidewall above the opening of the inner trough 15116. Hence, a L-shaped structure is attached to the inner sidewall 15111 of the frame body 1511 to enhance the outer side connecting strength of the elastic part 15222.

In addition, the inner side of the connection part 15221 of the elastic support component 1522 wraps the periphery of the diaphragm 1521, as shown in FIG. 6 and FIG. 7. In other words, the connection part 15221 extends on the top surface and the bottom surface of the diaphragm 1521 so that the connection part 15221 can stably connect to the diaphragm 1521. Afterwards, the voice coil 153 is fixed on the connection part 15221 so that when the voice coil 153 is vibrated by the interaction of the magnetic field of the magnetic circuit module 13, the voice coil 153 will directly act on the connection part 15221 of the elastic support component 1522. Because the clastic support component 1522 can directly bear higher vibration strength compared to the diaphragm 1521, it increases the fixing strength of the voice coil 153. In addition, it can be known from the figures that the inner side of the connection part 15221 wraps the top side and the bottom side on the periphery of the diaphragm

1521, and extends toward the center of the diaphragm 1521, which improves the waterproofing effect.

Please refer to FIG. 7 again. The speaker device 1 further includes a support ring 17 disposed on the connection position between the inner side of the bracket 151 and the elastic part 15222. Furthermore, the second elastic connection side 152222 extends to the sidewall above the opening of the inner trough 15116 to attach to the connection position of the elastic part 15222. In other words, the support ring 17 is disposed on the connection position between the second elastic connection side 152222 and the inner side of the bracket 151. The support ring 17 in this embodiment can be a support structure for setting a dust-proof net (not shown), and the dust-proof net is used to prevent dust from invading the diaphragm 1521 and elastic support component 1522.

Please refer to FIG. 3 to FIG. 5. The speaker device 1 further includes a conductive component 19, and the conductive component 19 includes a conductive part 191 and a conductive circuit 192. The conductive part 191 is fixed on the bottom of the magnetic guiding plate 11, one end of the conductive part 191 extends and is fixed on the auxiliary magnetic guiding component 134, one end of the conductive circuit 192 is connected to one end of the conductive part 191, and the other end of the conductive circuit 192 is connected to the voice coil 153. In this embodiment, by connecting the conductive part 191 on the bottom of the magnetic guiding plate 11 to external power (not shown), the conductive part 191 transmits power to the voice coil 153 through the conductive circuit 192. Furthermore, the inner side of the auxiliary magnetic guiding component 134 has a circuit notch 1343, and one end of the conductive circuit 192 passes through the circuit notch 1343 to connect to the voice coil 153. This is advantageous for the conductive circuit 192 to connect to the voice coil 153 through the auxiliary magnetic guiding component 134. Thus, the situation where the vibration of the voice coil 153 causes the conductive circuit 192 to vibrate can be avoided, and the circuit notch 1343 can reduce the interference of the auxiliary magnetic guiding component 134 on the vibration of the conductive circuit 192, and further, the situation where the conductive circuit 192 influences the vibration of the voice coil 153 in reverse is prevented. In this embodiment, when the voice coil 153 receives the input power to change the magnetic field, the voice coil 153 and the magnetic circuit module 13 interact mutually to make the voice coil 153 generate the vibration, and further the voice coil 153 drives the diaphragm 1521 of the vibration component 152 and the elastic support component 1522 to vibrate, and the diaphragm 1521 produce sound via the vibration. In summary, the present application provide a speaker device, which forms the elastic support component of the vibration component on the inner sidewall, the outer sidewall and the plurality of fixing holes of the bracket by the integral injection molding so that the elastic support component can be firmly combined with the bracket, not only can the bonding strength between the vibration component and the bracket be improved, but also the complete seal of the vibration component and the bracket can be realized in order to achieve the effective waterproofing effect.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A speaker device comprising:

a magnetic guiding plate;

a magnetic circuit module comprising a main magnet and an auxiliary magnet, wherein the main magnet and the auxiliary magnet are disposed on the magnetic guiding plate, and the auxiliary magnet is disposed on the outer side of the main magnet; and a vibration module comprising a bracket, a vibration component and a voice coil, wherein the bracket is disposed on the auxiliary magnet, the vibration component is disposed on the bracket and is located on the magnetic circuit module, the voice coil is disposed under the vibration component, and is located between the main magnet and the auxiliary magnet;

wherein, the vibration component comprises a diaphragm and an elastic support component, the bracket has an inner sidewall, an outer sidewall and a plurality of fixing holes penetrating the inner sidewall and the outer sidewall, the elastic support component has a connection part, an elastic part and a fixing part which are formed by integral injection molding, each of the connection part and the elastic part has an inner side and an outer side respectively, the inner side of the connection part is connected to and fixed to the diaphragm, the outer side of the connection part is connected to the inner side of the elastic part, the outer side of the elastic part is connected to the fixing part, and the fixing part is formed on the inner sidewall, the outer sidewall and the plurality of fixing holes;

wherein the fixing part comprises an inner fixing part and an outer fixing part, the outer fixing part has a protrusion part, the protrusion part has a convex surface, a first inclined surface and a second inclined surface, the first inclined surface and the second inclined surface are disposed at both sides of the convex surface, and the first inclined surface and the second inclined surface are symmetrically arranged based on the convex surface.

2. The speaker device as claimed in claim 1, wherein the inner fixing part and the outer fixing part are connected to each other by the plurality of fixing holes, the inner fixing part is fixed on the inner sidewall, and the outer fixing part is fixed on the outer sidewall.

3. The speaker device as claimed in claim 2, wherein the outer sidewall has an outer trough connected to the plurality of fixing holes mutually, and the outer trough and the plurality of fixing holes are filled with the outer fixing part.

4. The speaker device as claimed in claim 3, wherein the outer sidewall further has an outer fixing trough positioned in the outer trough, the outer fixing trough and the outer trough are connected to each other, and the outer fixing trough is further filled with the outer fixing part.

5. The speaker device as claimed in claim 1, wherein the protrusion part disposed one side far away from the inner fixing part.

6. The speaker device as claimed in claim 1, wherein the inner sidewall has an inner trough connected to the plurality of fixing holes mutually, and the inner trough and the plurality of fixing holes are filled with the inner fixing part.

7. The speaker device as claimed in claim 6, wherein the outer side of the elastic part is divided into a first elastic connection side and a second elastic connection side, the first elastic connection side extends to and is attached to a trough wall of the inner trough, the first elastic connection side is connected to the inner fixing part, and the second elastic connection side extends toward and is attached to a sidewall above an opening of the inner trough.

8. The speaker device as claimed in claim 1, the inner side of the connection part wraps a periphery of the diaphragm.

9. The speaker device as claimed in claim 8, wherein the voice coil is connected and fixed to the connection part.

10. The speaker device as claimed in claim 1, further comprising a support ring, wherein the bracket has an inner side, and there is a connection position between the inner side of the bracket and the elastic part, and the support ring is disposed on the connection position between the inner side of the bracket and the elastic part.

11. The speaker device as claimed in claim 1, wherein the magnetic circuit module further comprises a main magnetic guiding component and an auxiliary magnetic guiding component, the main magnetic guiding component is disposed on the main magnet, and the auxiliary magnetic guiding component is disposed on the auxiliary magnet.

12. The speaker device as claimed in claim 11, wherein the auxiliary magnetic guiding component comprises an inner magnetic guiding part and an outer magnetic guiding part, the outer magnetic guiding part is disposed on an outer side of the inner magnetic guiding part, a height from a top surface of the inner magnetic guiding part to a top surface of the auxiliary magnet is higher compared to that from a top surface of the outer magnetic guiding part to the top surface of the auxiliary magnet.

13. The speaker device as claimed in claim 12, wherein the bracket has a frame body disposed on the outer magnetic guiding part.

14. The speaker device as claimed in claim 13, wherein the bracket has a bottom with a fixing notch, and the outer magnetic guiding part is fixed in the fixing notch.

15. The speaker device as claimed in claim 1, wherein the protrusion part protrudes from the outer sidewall.

* * * * *